United States Patent [19]

Henry

[11] Patent Number: 4,920,872
[45] Date of Patent: May 1, 1990

[54] APPARATUS FOR COOKING CORN ON THE COB

[76] Inventor: Peter M. J. Henry, 32 Havil Street, London SE 5 7RS, England

[21] Appl. No.: 88,167

[22] Filed: Aug. 21, 1987

[30] Foreign Application Priority Data

Aug. 22, 1986 [GB] United Kingdom ............... 8620415

[51] Int. Cl.$^5$ ........................................... A47J 37/04
[52] U.S. Cl. ...................................... 99/339; 99/357; 99/386; 99/423; 99/441; 99/443 C; 99/446; 99/447; 126/25 R; 126/181
[58] Field of Search ................. 99/330, 339, 357, 403, 99/409, 416, 426, 441, 386, 423, 443 C, 446, 447; 126/25 A, 25 AA, 276, 176 R, 181, 25 R; 198/780, 789

[56] References Cited

U.S. PATENT DOCUMENTS

| | | | |
|---|---|---|---|
| 3,492,938 | 2/1970 | Oxford | 99/339 |
| 3,802,413 | 4/1974 | Pepin | 126/25 A |
| 4,332,189 | 6/1982 | Stuck | 99/339 |
| 4,350,140 | 9/1982 | Hamilton, Jr. | 126/276 |
| 4,370,920 | 2/1983 | Henriques et al. | 99/339 |
| 4,446,846 | 6/1984 | Hahn | 99/447 |
| 4,757,755 | 7/1988 | Sarten | 99/357 |

FOREIGN PATENT DOCUMENTS 8700410 1/1987 PCT Int'l Appl. ............... 99/446

Primary Examiner—Timothy F. Simone
Attorney, Agent, or Firm—Panitch Schwarze Jacobs & Nadel

[57] ABSTRACT

A method of cooking corn on the cob wherein the corn is partially cooked in a parboiling assembly, removed, and then roasted, grilled or broiled on a roasting assembly. The roasting assembly comprises a heat source disposed adjacent a gridiron composed of substantially parallel elongate cylindrical elements. These elements are spaced apart to support a corn cob between the or each pair of neighbouring elements, and are mounted for rotation to rotate the corn cob or cobs thereon. The parboiling assembly and the roasting assembly are parts of the same apparatus which, in one preferred form, is mounted on wheels to render it easily movable, under human power, between locations where freshly roasted corn is to be made or served, e.g. to be offered for sale.

5 Claims, 4 Drawing Sheets

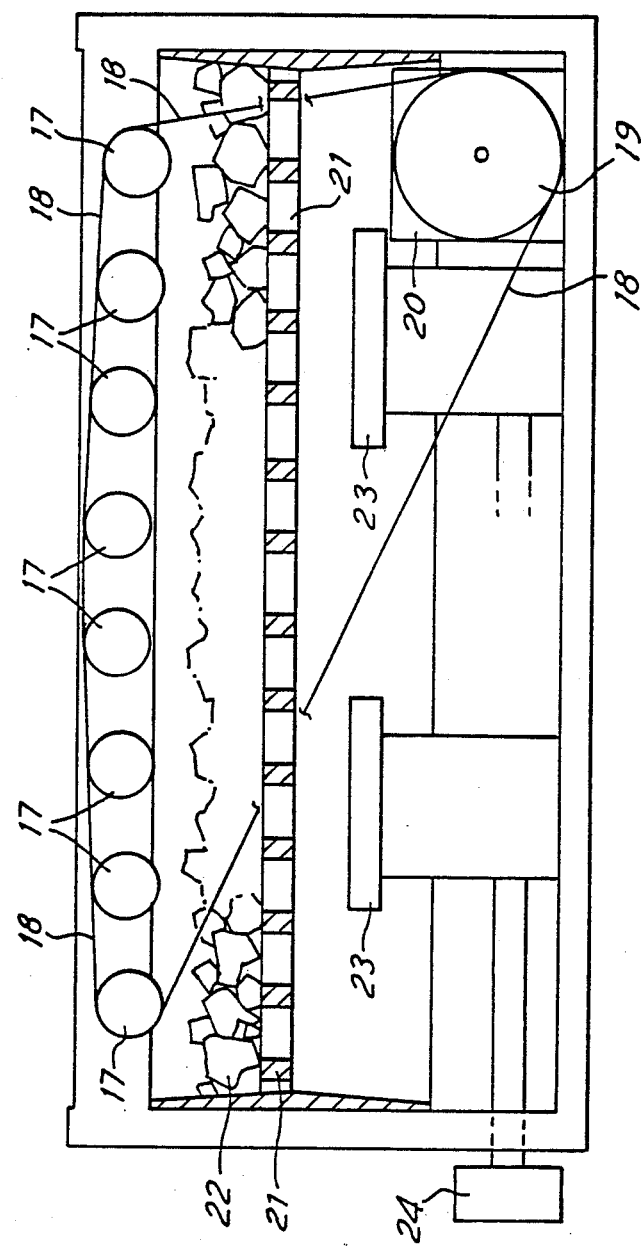

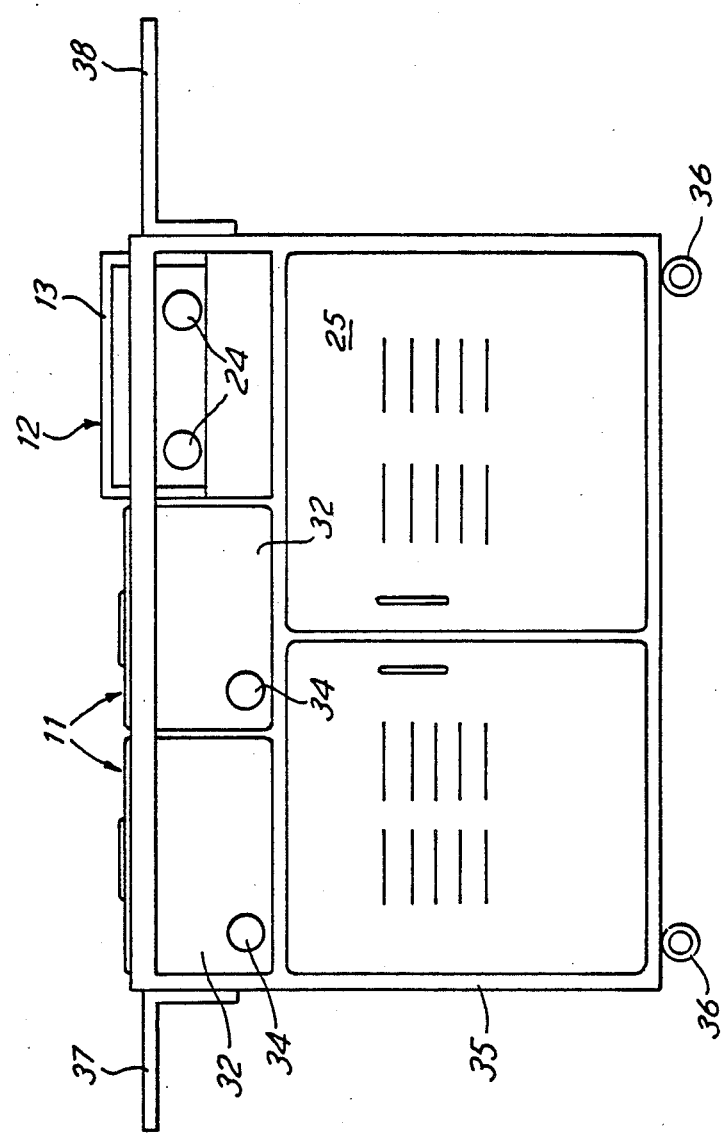

APPARATUS FOR COOKING CORN ON THE COB

This invention relates to cooking and in particular to the cooking of corn on the cob.

It is well known to cook such corn cobs by boiling them to final cooked form in which they are ready to eat. In so doing, much of the flavour inherent in the corn is lost. It is therefore desirable to avoid or minimise the extent to which this occurs.

According to one aspect of the present invention there is provided a method of cooking corn on the cob wherein the corn is partially cooked in boiling water, removed, and then roasted, grilled or broiled (preferably on a gridiron).

According to another aspect of this invention there is provided apparatus for use in cooking corn on the cob, said apparatus including a roasting assembly comprising heating means disposed adjacent (preferably beneath) a gridiron composed of substantially parallel elongate cylindrical elements, wherein said elements are spaced apart to support a said corn cob between the or each pair of neighbouring elements, and wherein said elements are mounted for rotation thereby to rotate the corn cob or cobs thereon.

Preferably the said elements are rotatable by means of a drive transmission (e.g. gear wheels that are intermeshing or are interconnected by a drive chain) arranged to be driven by a motor (e.g. a battery powered D.C. electric motor). Advantageously, the drive transmission is arranged to rotate all the said cylindrical elements in the same direction.

Preferably the heating means comprises a grill supporting a bed of coals, charcoal, lava rock or other like diathermic and/or pyrolytic material (as, for example, used in braziers), the grill-supported bed being disposed beneath the gridiron and above one or more gas burners (e.g. fuelled by bottled propoane gas).

Advantageously, the apparatus also includes a parboiling assembly comprising a pan (for water) disposed above a (further) gas burner. Preferably the pan is of rectangular plan outline and the (further) gas burner comprises an elongate pipe below the pan and extending generally diagonally of the base of the pan.

Preferably the burner is surrounded by a wall of generally rectangular plan outline and apertured for ventilation of the burner, the wall serving as a support for the pan. Preferably the pan is nested within an upper region of the wall.

Preferably the apparatus is mounted on wheels to render it easily movable, under human power, between locations where freshly roasted corn is to be offered for sale.

According to yet another aspect of this invention there is provided apparatus for use in cooking corn on the cob, comprising a parboiling assembly including:

a wall of predetermined plan outline having upper and lower regions, a pan of corresponding outline nested within said upper region of the wall, and a first gas burner for heating said pan disposed below said pan within said lower region of the wall, the lower region of the wall being apertured for ventilation of the gas burner; and further comprising a roasting assembly including:

a gridiron composed of substantially parallel elongate cylindrical elements, said elements being space apart to support a said corn cob between the or each pair of neighbouring elements, means mounting said elements for rotation, an electric motor and drive transmission therefrom to rotate all the said cylindrical elements in the same one direction and hence rotate the corn cob or cobs on said elements in the opposite direction, and heating means comprising at least one second gas burner, a grill mounted above said second gas burner(s), and a bed of refractory material supported by said grill beneath the gridiron.

The term "refractory material" as used herein refers to diathermic material or pyrolytic material or a mixture of diathermic and pyrolytic materials.

By way of non-limiting example, embodiments of this invention will now be described with reference to the accompanying drawings wherein:

FIG. 3 is a schematic elevational view in the direction of arrow III of FIG. 2, and FIG. 4 is a schematic elevational view in the direction of arrow IV of FIG. 1.

Figure 1:
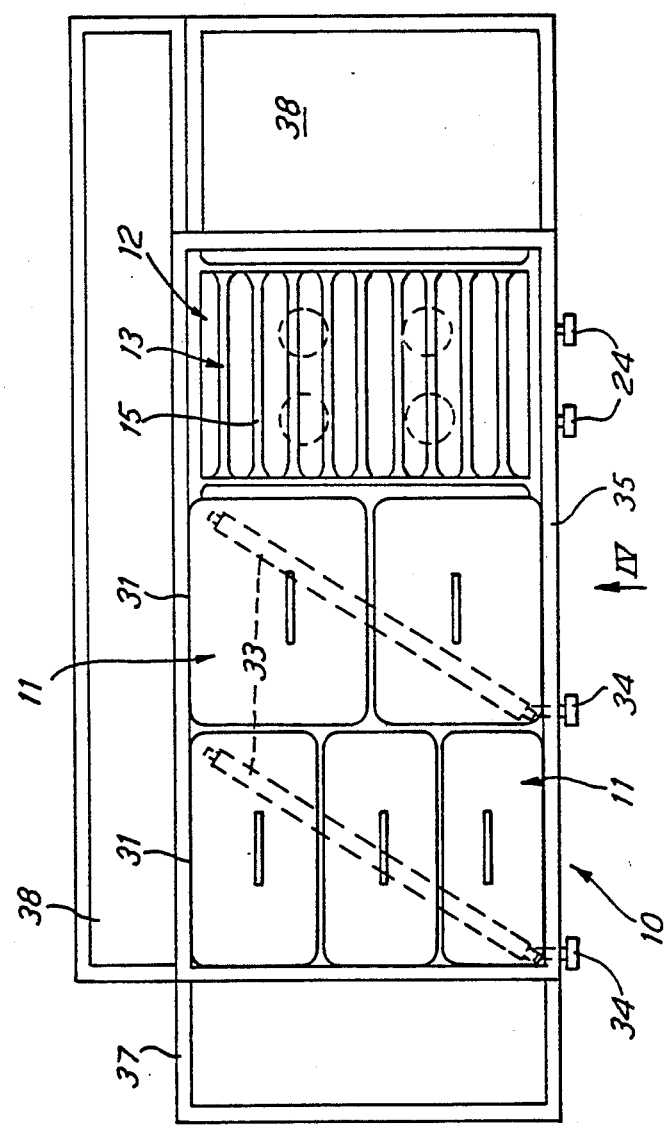
FIG. 1 is a schematic plan view of apparatus according to this invention.
Figure 2:
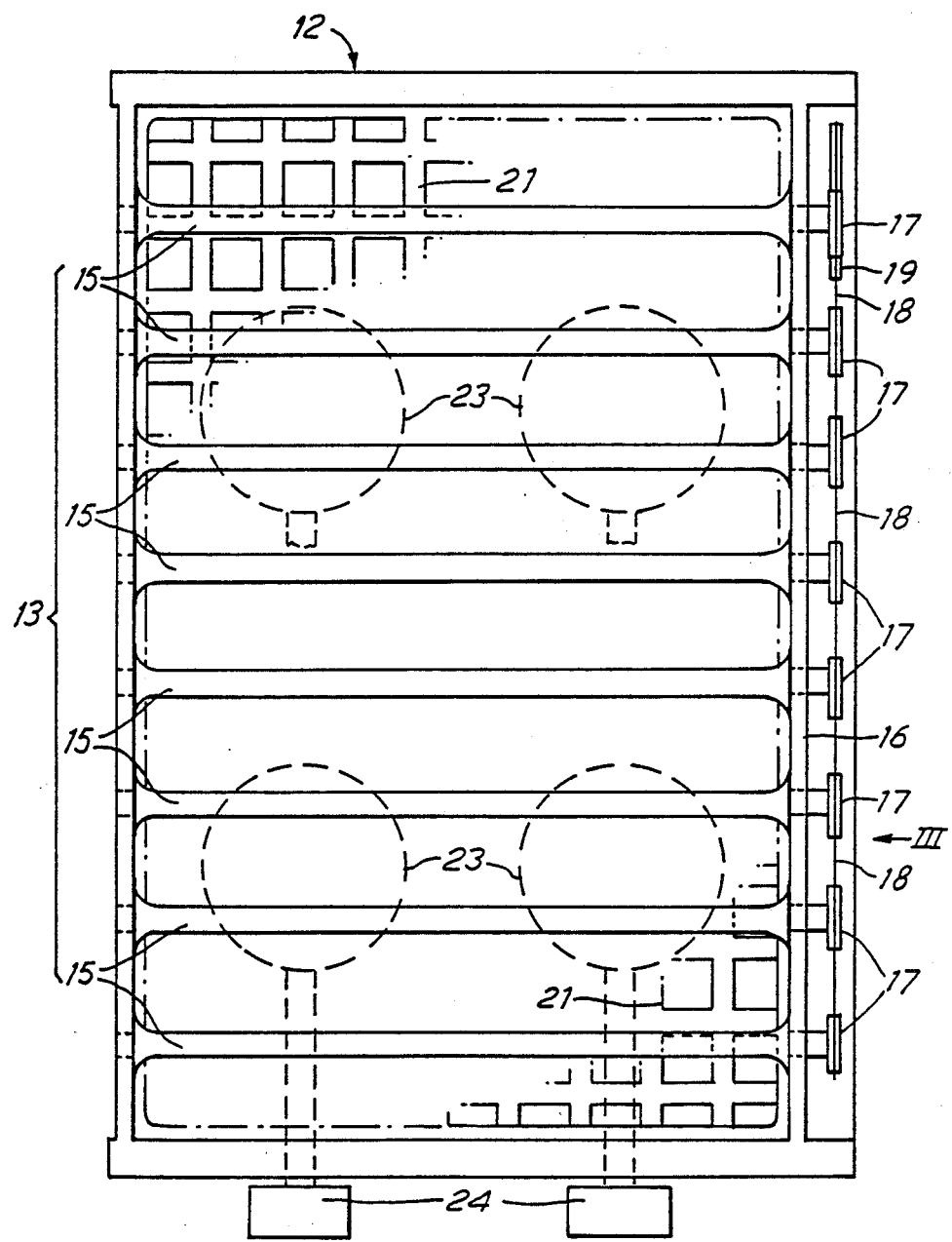
FIG. 2 is an enlarged plan view of part of the apparatus of FIG. 1

The illustrated apparatus 10 (FIGS. 1 and 4) is for cooking corn on the cob. Initially, frozen cobs of corn (maize) are partially (e.g. 2/3rds) cooked in one or other of two similar parboiling assemblies 11. The hot liquid within assembly 11 is a "soup" of water, herbs and seasonings, and the corn is cooked therein until its core temperature is of the order of 70° C. The parboiled cobs of corn are then transferred (by hand-held tongs or by an automatically operating apparatus—not shown) to a roasting assembly 12 (FIGS. 2 and 3). The latter comprises a gridiron 13 formed by a plurality (e.g. eight or nine) long rods 15 of generally cylindrical shape disposed in equi-spaced parallel relation to one another in a horizontal plane or, as shown, over an imaginary convex cylindrical surface of large radius. The rods 15 are mounted at the top of the roasting assembly 12 and extend between two side walls 14,16 of the assembly, the surface of each rod flaring outwardly adjacent its ends to avoid a sharp, dirt-collecting arris where the rods 15 meet the side walls 14,16. Each of the rods 15 is provided with an axial stub which extends through the side wall 16 and terminates in a gear wheel 17 rotationally fast with the rod. A continuous drive chain 18 drivingly couples all the gear wheels 17 to one another and to a larger gear wheel 19 mounted on the output shaft of an electric motor 20, e.g. a D.C. electric motor.

The drive transmission of wheels 17,19 and chain 18 provides for all the rods 15 to rotate in the same sense. As a result, a cob placed on the gridiron 13 to extend substantially parallel to the rods 15 and to rest between one such rod and the next-adjacent rod, will be rotated in the opposite sense. By positioning the rods 15 over an imaginary convex cylindrical surface of large radius, the chain 18 is retained by gravity in meshing engagement with all the gear wheels 17. Alternatively, and especially if the rods 15 are disposed in a substantially horizontal plane, the chain 18 may be urged into meshing engagement of the gear wheels 17 by idler rollers or gears mounted on stub shafts projecting from side wall 16.

Alternatively, and in either case, the chain 18 may be wholly omitted and the drive transmission between the motor 20 and the rods 15 effected by a gear train including the gear wheel 19 and intervening gear wheels between, and in mesh with, the gear wheels 17. In such an arrangement, the walls 14,16 may constitute the side walls of a rectangular frame that is hinged by one end wall to a support structure or frame 35 such as to be pivotally raisable (e.g. by a handle at the opposite end) to facilitate cleaning and general maintenance.

Below the gridiron 13 of rods 15, a ceramic grid or lattice 21 supports a bed 22 of coals, charcoal, lava rock or other like diathermic and/or pyrolytic material (as, for example, used in braziers). The bed 22 has been omitted from FIG. 2 for clarity of illustration. Alternatively the lattice 21 may be made from an oversize sheet of metal mesh material that is bent to form one or two pairs of oppositely disposed limbs to rest on a base portion and thereby support the main surface of the lattice in a horizontal plane. The space beneath the main horizontal surface of the grid or lattice 21 (i.e. between the depending limbs) accomodates a thermally insulated housing for the motor 20 and also four gas burner rings 23 arranged in a rectangular array. The gas supply to the burner rings 23 may be from the domestic gas supply (in a fixed installation) or may be propane supplied via control valves 24 from a "bottle" (not shown) of liquefied propane gas, the bottle being housed in a drawer or cupboard 25 below the roasting assembly 12. This drawer or cupboard 25 can also house an electric cell or battery to provide the electrical supply to the D.C. motor 20 (of a non-fixed installation().

Each of the two parboiling assemblies 11 comprises a lid-covered deep pan 31 of generally rectangular shape nested within an encompassing, similar shaped, metal wall 32. The lower portion of wall 32 extends (in the manner of a skirt) below the base of pan 31 and provides, in one corner, a mounting for an elongate pipe-like gas burner 33. The latter extends horizontally below the base of pan 31 in a direction towards the diagonally opposite corner of the wall 32. The sides of this lower wall portion are apertured to provide ventilation for the elongate gas burner 33. A control valve 34 controls the supply of gas to burner 33, e.g. (in a non-fixed installation) from the "bottle" located within drawer or cupboard 25 providing the gas supply to ring burners 23. The burners 23,33 may be provided with piezo-electric or other automated igniters.

The two parboiling assemblies 11 and the roasting assembly 12 are mounted side by side in the support structure 35. The structure 35 is mounted either on level-adjustable feet (for a fixed installation) or on wheels 36 to provide the complete apparatus 10 with appropriate mobility to facilitate its being moved (i.e. pushed and/or pulled) along the ground to any location where freshly roasted corn on the cob is to be made, e.g. to be offered for sale. To assist in moving the support structure 35, a handle 37 is provided at one end of the apparatus. Conveniently, a shelf or counter 38 is provided along the opposite end of the apparatus and along the intended "front" of the apparatus, this shelf or counter serving to support condiments, serviettes, cob holders and other appropriate articles for the convenience of custmers and/or to assist sales of the freshly roasted corn.

I claim:

1. Apparatus for use in cooking corn on the cob, comprising a parboiling assembly including:
   a wall of generally rectangular plan outline having upper and lower regions,
   a pan of rectangular plan outline nested within said upper region of the wall, and
   a first gas burner for heating said pan disposed below said pan within said lower region on the wall, the lower region of the wall being apertures for ventilation of the gas burner and the burner comprising an elongate pipe extending generally diagonally of the base of the pan; and further comprising a rotating assembly including:
   a gridiron composed of substantially parallel elongate cylindrical elements, said elements being spaced apart to support a said corn cob between the or each pair of neighbouring elements,
   means mounting said elements for rotation,
   an electric motor and drive transmission therefrom to rotate all the said cylindrical elements in the same one direction and hence rotate the corn cob or cobs on said elements in the opposite direction, and
   heating means comprising at least one second gas burner, a grill mounted above said second gas burner(s), and a bed of refractory material supported by said grill beneath the gridiron.

2. Apparatus according to claim 1 and mounted on wheels to render it easily movable, under human power, between locations where freshly roasted corn is to be made.

3. Apparatus for use in cooking corn on the cob, comprising a parboiling assembly including:
   a wall of predetermined plan outline having upper and lower regions,
   a pan of corresponding plan outline nested within said upper region of the wall, and
   a first gas burner for heating said pan disposed below said pan within said lower region of the wall, the lower region of the wall being apertured for ventilation of the gas burner; and further comprising a roasting assembly including:
   a gridiron composed of substantially parallel elongate cylindrical elements, said elements being spaced apart to support a said corn cob between the or each pair of neighbouring elements,
   means mounting said elements for rotation,
   an electric motor and drive transmission therefrom to rotate all the said cylindrical elements in the same one direction and hence rotate the corn cob or cobs on said elements in the opposite direction, and
   heating means comprising at least one second gas burner, a grill mounted above said second gas burner(s), and a bed of refractory material supported by said grill beneath the gridiron.

4. Apparatus according to claim 3 wherein the wall and the pan are of rectangular plan outline and the gas burner for heating the pan comprises an elongated pipe below the pan and extending generally diagonally of the base of the pan.

5. Apparatus according to claim 3 and mounted on wheels to render it easily movable, under human power, between locations where freshly roasted corn is to be made.

* * * * *